(12) United States Patent
Hirano

(10) Patent No.: US 9,300,219 B2
(45) Date of Patent: Mar. 29, 2016

(54) POWER CONVERSION APPARATUS AND POWER CONVERSION METHOD

(71) Applicant: Toyota Jidosha Kabushiki Kaisha, Toyota-shi Achi-ken (JP)

(72) Inventor: Takahiro Hirano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 126 days.

(21) Appl. No.: 14/282,453

(22) Filed: May 20, 2014

(65) Prior Publication Data

US 2014/0347890 A1 Nov. 27, 2014

(30) Foreign Application Priority Data

May 21, 2013 (JP) ................................. 2013-107418

(51) Int. Cl.
*H02M 3/335* (2006.01)

(52) U.S. Cl.
CPC ...... *H02M 3/33584* (2013.01); *H02M 3/33546* (2013.01); *H02M 3/33561* (2013.01)

(58) Field of Classification Search
CPC ............ H02M 3/33546; H02M 3/335; H02M 3/33584; H02M 3/33561; H02M 3/33523; H02M 3/3353; H02M 3/33576; H02M 1/081; H02M 2003/1586; H02M 2001/0025
See application file for complete search history.

(56) References Cited

U.S. PATENT DOCUMENTS

| 2007/0195557 | A1* | 8/2007 | Su | B60K 6/28 363/17 |
|---|---|---|---|---|
| 2008/0174276 | A1* | 7/2008 | Takahashi | H02J 9/061 320/128 |
| 2008/0212340 | A1* | 9/2008 | Tao | H02M 3/33584 363/17 |
| 2009/0237057 | A1* | 9/2009 | Dishman | H02M 3/156 323/285 |
| 2010/0128501 | A1* | 5/2010 | Huang | H02M 3/33523 363/21.16 |
| 2011/0198933 | A1 | 8/2011 | Ishigaki et al. | |
| 2011/0249472 | A1* | 10/2011 | Jain | H02M 3/33584 363/15 |
| 2012/0020126 | A1* | 1/2012 | Moki | H02M 3/33561 363/71 |
| 2012/0140524 | A1* | 6/2012 | Manabe | H02M 3/3378 363/17 |
| 2012/0250370 | A1* | 10/2012 | Taniguchi | H02M 3/33561 363/34 |

FOREIGN PATENT DOCUMENTS

JP 2011-193713 A 9/2011

* cited by examiner

*Primary Examiner* — Fred E Finch, III
*Assistant Examiner* — Gustavo Rosario Benitez
(74) *Attorney, Agent, or Firm* — Dinsmore & Shohl LLP

(57) ABSTRACT

A power conversion apparatus includes: a primary side circuit; a secondary side circuit that is magnetically coupled to the primary side circuit by a transformer; and a control unit that adjusts a transmitted power transmitted between the primary side circuit and the secondary side circuit by changing a phase difference between a switching operation of the primary side circuit and a switching operation of the secondary side circuit such that a port voltage of one port from among a primary side port provided in the primary side circuit and a secondary side port provided in the secondary side circuit converges on a target voltage. The control unit reduces the target voltage when the phase difference is equal to an upper limit value and the port voltage is smaller than a set threshold.

8 Claims, 4 Drawing Sheets

POWER CONVERSION APPARATUS AND POWER CONVERSION METHOD

INCORPORATION BY REFERENCE

The disclosure of Japanese Patent Application No. 2013-107418 filed on May 21, 2013 including the specification, drawings and abstract is incorporated herein by reference in its entirety.

BACKGROUND OF THE INVENTION

1. Field of the Invention

The invention relates to an apparatus and a method for performing a power conversion between a primary side circuit and a secondary side circuit that is magnetically coupled to the primary side circuit via a transformer.

2. Description of Related Art

A conventional power conversion apparatus can adjust an amount of power transmitted between an input/output port of a primary side circuit and an input/output port of a secondary side circuit by changing a phase difference between a switching operation of the primary side circuit and a switching operation of the secondary side circuit (see Japanese Patent Application Publication No. 2011-193713 (JP 2011-193713 A), for example).

SUMMARY OF THE INVENTION

However, when a current flowing through the input/output port exceeds a designed envisaged value (when a load is appended to the input/output port by a user or the like, for example), a port voltage in the input/output port may drop. An object of the invention is to provide a power conversion apparatus and a power conversion method with which a drop in a port voltage can be suppressed.

A first aspect of the invention is a power conversion apparatus including: a primary side circuit; a secondary side circuit that is magnetically coupled to the primary side circuit by a transformer; and a control unit that adjusts a transmitted power transmitted between the primary side circuit and the secondary side circuit by changing a phase difference between a switching operation of the primary side circuit and a switching operation of the secondary side circuit such that a port voltage of one port from among a primary side port provided in the primary side circuit and a secondary side port provided in the secondary side circuit converges on a target voltage, wherein the control unit reduces the target voltage when the phase difference is equal to an upper limit value and the port voltage is smaller than a set threshold.

A second aspect of the invention is a power conversion method for adjusting a transmitted power transmitted between a primary side circuit and a secondary side circuit, which is magnetically coupled to the primary side circuit by a transformer, by changing a phase difference between a switching operation of the primary side circuit and a switching operation of the secondary side circuit such that a port voltage of one port from among a primary side port provided in the primary side circuit and a secondary side port provided in the secondary side circuit converges on a target voltage, wherein the target voltage is reduced when the phase difference is equal to an upper limit value and the port voltage is smaller than a set threshold.

According to the first and second aspects described above, a drop in the port voltage can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
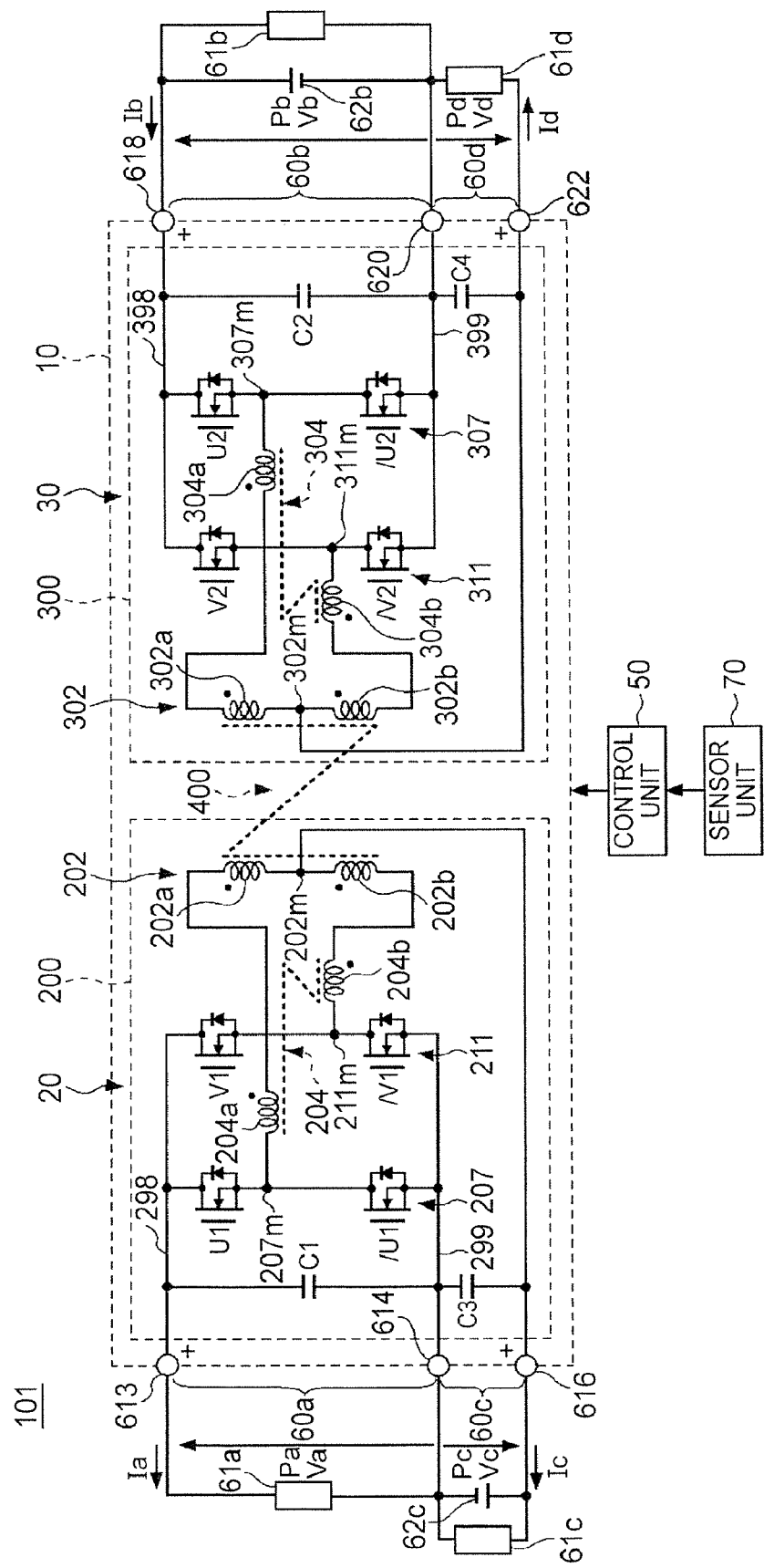
FIG. 1 is a block diagram showing an example of a configuration of a power supply apparatus serving as an embodiment of a power conversion apparatus according to the invention.

FIG. 1 is a block diagram showing an example of a configuration of a power supply apparatus 101 serving as an embodiment of a power conversion apparatus. For example, the power supply apparatus 101 is a power supply system that includes a power supply circuit 10, a control unit 50, and a sensor unit 70.

For example, the power supply apparatus 101 includes, as primary side ports, a first input/output port 60a to which a primary side high voltage system load 61a is connected and a second input/output port 60c to which a primary side low voltage system load 61c and a primary side low voltage system power supply 62c are connected. The primary side low voltage system power supply 62c supplies power to the primary side low voltage system load 61c, which is operated by an identical voltage system (a 12 V system, for example) to the primary side low voltage system power supply 62c. Further, the primary side low voltage system power supply 62c supplies power stepped up by a primary side conversion circuit 20 provided in the power supply circuit 10 to the primary side high voltage system load 61a, which is operated by a different voltage system (a higher 48 V system than the 12 V system, for example) to the primary side low voltage system power supply 62c. A secondary battery such as a lead battery may be cited as a specific example of the primary side low voltage system power supply 62c.

For example, the power supply apparatus 101 includes, as secondary side ports, a third input/output port 60b to which a secondary side high voltage system load 61b and a secondary side high voltage system power supply 62b are connected and a fourth input/output port 60d to which a secondary side low voltage system load 61d is connected. The secondary side high voltage system power supply 62b supplies power to the secondary side high voltage system load 61b, which is operated by an identical voltage system (a higher 288 V system than the 12 V system and the 48 V system, for example) to the secondary side high voltage system power supply 62b. Further, the secondary side high voltage system power supply 62b supplies power stepped up by a secondary side conversion circuit 30 provided in the power supply circuit 10 to the secondary side low voltage system load 61d, which is operated by a different voltage system (a lower 72 V system than the 288 V system, for example) to the secondary side high voltage system power supply 62b. A secondary battery such as a lithium ion battery may be cited as a specific example of the secondary side high voltage system power supply 62b.

The power supply circuit 10 is a power conversion circuit that includes the four input/output ports described above and has functions for selecting two desired input/output ports from the four input/output ports and performing power conversion between the two selected input/output ports.

Port powers Pa, Pc, Pb, Pd are input/output powers (input powers or output powers) of the first input/output port 60a, the second input/output port 60c, the third input/output port 60b, and the fourth input/output port 60d, respectively. Port voltages Va, Vc, Vb, Vd are input/output voltages (input voltages or output voltages) of the first input/output port 60a, the second input/output port 60c, the third input/output port 60b, and the fourth input/output port 60d, respectively. Port currents Ia, Ic, Ib, Id are input/output currents (input currents or output currents) of the first input/output port 60a, the second input/output port 60c, the third input/output port 60b, and the fourth input/output port 60d, respectively.

The power supply circuit 10 includes a capacitor C1 provided in the first input/output port 60a, a capacitor C3 provided in the second input/output port 60c, a capacitor C2 provided in the third input/output port 60b, and a capacitor C4 provided in the fourth input/output port 60d. Film capacitors, aluminum electrolytic capacitors, ceramic capacitors, polymer electrolytic capacitors, and so on may be cited as specific examples of the capacitors C1, C2, C3, C4.

The capacitor C1 is inserted between a high potential side terminal 613 of the first input/output port 60a and a low potential side terminal 614 of the first input/output port 60a and the second input/output port 60c. The capacitor C3 is inserted between a high potential side terminal 616 of the second input/output port 60c and the low potential side terminal 614 of the first input/output port 60a and the second input/output port 60c. The capacitor C2 is inserted between a high potential side terminal 618 of the third input/output port 60b and a low potential side terminal 620 of the third input/output port 60b and the fourth input/output port 60d. The capacitor C4 is inserted between a high potential side terminal 622 of the fourth input/output port 60d and the low potential side terminal 620 of the third input/output port 60b and the fourth input/output port 60d.

The capacitors C1, C2, C3, C4 may be provided either inside or outside the power supply circuit 10.

The power supply circuit 10 is a power conversion circuit configured to include the primary side conversion circuit 20 and the secondary side conversion circuit 30. Note that the primary side conversion circuit 20 and the secondary side conversion circuit 30 are connected via a primary side magnetic coupling reactor 204 and a secondary side magnetic coupling reactor 304, and magnetically coupled by a transformer 400 (a center tapped transformer).

The primary side conversion circuit 20 is a primary side circuit configured to include a primary side full bridge circuit 200, the first input/output port 60a, and the second input/output port 60c. The primary side full bridge circuit 200 is a primary side power conversion unit configured to include a primary side coil 202 of the transformer 400, the primary side magnetic coupling reactor 204, a primary side first upper arm U1, a primary side first lower arm/U1, a primary side second upper arm V1, and a primary side second lower arm /V1. Here, the primary side first upper arm U1, the primary side first lower arm/U1, the primary side second upper arm V1, and the primary side second lower arm/V1 are constituted by switching elements respectively configured to include, for example, an N channel type metal oxide semiconductor field effect transistor (MOSFET) and a body diode serving as a parasitic element of the MOSFET. Additional diodes may be connected to the MOSFET in parallel.

The primary side full bridge circuit 200 includes a primary side positive electrode bus line 298 connected to the high potential side terminal 613 of the first input/output port 60a, and a primary side negative electrode bus line 299 connected to the low potential side terminal 614 of the first input/output port 60a and the second input/output port 60c.

A primary side first arm circuit 207 connecting the primary side first upper arm U1 and the primary side first lower arm/U1 in series is attached between the primary side positive electrode bus line 298 and the primary side negative electrode bus line 299. The primary side first arm circuit 207 is a primary side first power conversion circuit unit (a primary side U phase power conversion circuit unit) capable of performing a power conversion operation by switching the primary side first upper arm U1 and the primary side first lower arm/U1 ON and OFF. Further, a primary side second arm circuit 211 connecting the primary side second upper arm V1 and the primary side second lower arm/V1 in series is attached between the primary side positive electrode bus line 298 and the primary side negative electrode bus line 299 in parallel with the primary side first arm circuit 207. The primary side second arm circuit 211 is a primary side second power conversion circuit unit (a primary side V phase power conversion circuit unit) capable of performing a power conversion operation by switching the primary side second upper arm V1 and the primary side second lower arm /V1 ON and OFF.

The primary side coil 202 and the primary side magnetic coupling reactor 204 are provided in a bridge part connecting a midpoint 207m of the primary side first arm circuit 207 to a midpoint 211m of the primary side second aim circuit 211. To describe connection relationships to the bridge part in more detail, one end of a primary side first reactor 204a of the primary side magnetic coupling reactor 204 is connected to the midpoint 207m of the primary side first arm circuit 207, and one end of the primary side coil 202 is connected to another end of the primary side first reactor 204a. Further, one end of a primary side second reactor 204b of the primary side magnetic coupling reactor 204 is connected to another end of the primary side coil 202, and another end of the primary side second reactor 204b is connected to the midpoint 211m of the primary side second arm circuit 211. Note that the primary side magnetic coupling reactor 204 is configured to include the primary side first reactor 204a and the primary side second reactor 204b, which is magnetically coupled to the primary side first reactor 204a by a coupling coefficient $k_1$.

The midpoint 207m is a primary side first intermediate node between the primary side first upper arm U1 and the primary side first lower arm/U1, and the midpoint 211m is a primary side second intermediate node between the primary side second upper arm V1 and the primary side second lower arm/V1.

The first input/output port 60a is a port provided between the primary side positive electrode bus line 298 and the primary side negative electrode bus line 299. The first input/output port 60a is configured to include the terminal 613 and the terminal 614. The second input/output port 60c is a port provided between the primary side negative electrode bus line 299 and a center tap 202m of the primary side coil 202. The second input/output port 60c is configured to include the terminal 614 and the terminal 616.

The center tap 202m is connected to the high potential side terminal 616 of the second input/output port 60c. The center tap 202m is an intermediate connection point between a primary side first winding 202a and a primary side second winding 202b constituting the primary side coil 202.

The secondary side conversion circuit 30 is a secondary side circuit configured to include a secondary side full bridge circuit 300, the third input/output port 60b, and the fourth input/output port 60d. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm/U2, a secondary side second upper arm V2, and a secondary side second lower arm/V2. Here, the secondary side first upper arm U2, the secondary side first lower arm/U2, the secondary side second upper arm V2, and the secondary side second lower arm/V2 are constituted by switching elements respectively configured to include, for example, an N channel type MOSFET and a body diode serving as a parasitic element of the MOSFET. Additional diodes may be connected to the MOSFET in parallel.

The secondary side full bridge circuit 300 includes a secondary side positive electrode bus line 398 connected to the high potential side terminal 618 of the third input/output port 60b, and a secondary side negative electrode bus line 399 connected to the low potential side terminal 620 of the third input/output port 60b and the fourth input/output port 60d.

A secondary side first arm circuit 307 connecting the secondary side first upper arm U2 and the secondary side first lower arm/U2 in series is attached between the secondary side positive electrode bus line 398 and the secondary side negative electrode bus line 399. The secondary side first arm circuit 307 is a secondary side first power conversion circuit unit (a secondary side U phase power conversion circuit unit) capable of performing a power conversion operation by switching the secondary side first upper arm U2 and the secondary side first lower arm/U2 ON and OFF. Further, a secondary side second arm circuit 311 connecting the secondary side second upper arm V2 and the secondary side second lower arm/V2 in series is attached between the secondary side positive electrode bus line 398 and the secondary side negative electrode bus line 399 in parallel with the secondary side first arm circuit 307. The secondary side second arm circuit 311 is a secondary side second power conversion circuit unit (a secondary side V phase power conversion circuit unit) capable of performing a power conversion operation by switching the secondary side second upper arm V2 and the secondary side second lower arm/V2 ON and OFF.

The secondary side coil 302 and the secondary side magnetic coupling reactor 304 are provided in a bridge part connecting a midpoint 307m of the secondary side first arm circuit 307 to a midpoint 311m of the secondary side second arm circuit 311. To describe connection relationships to the bridge part in more detail, one end of a secondary side first reactor 304a of the secondary side magnetic coupling reactor 304 is connected to the midpoint 307m of the secondary side first arm circuit 307, and one end of the secondary side coil 302 is connected to another end of the secondary side first reactor 304a. Further, one end of a secondary side second reactor 304b of the secondary side magnetic coupling reactor 304 is connected to another end of the secondary side coil 302, and another end of the secondary side second reactor 304b is connected to the midpoint 311m of the secondary side second arm circuit 311. Note that the secondary side magnetic coupling reactor 304 is configured to include the secondary side first reactor 304a and the secondary side second reactor 304b, which is magnetically coupled to the secondary side first reactor 304a by a coupling coefficient $k_2$.

The midpoint 307m is a secondary side first intermediate node between the secondary side first upper arm U2 and the secondary side first lower arm/U2, and the midpoint 311m is a secondary side second intermediate node between the secondary side second upper arm V2 and the secondary side second lower arm/V2.

The third input/output port 60b is a port provided between the secondary side positive electrode bus line 398 and the secondary side negative electrode bus line 399. The third input/output port 60b is configured to include the terminal 618 and the terminal 620. The fourth input/output port 60d is a port provided between the secondary side negative electrode bus line 399 and a center tap 302m of the secondary side coil 302. The fourth input/output port 60d is configured to include the terminal 620 and the terminal 622.

The center tap 302m is connected to the high potential side terminal 622 of the fourth input/output port 60d. The center tap 302m is an intermediate connection point between a secondary side first winding 302a and a secondary side second winding 302b constituting the secondary side coil 302.

In FIG. 1, the power supply apparatus 101 includes the sensor unit 70. The sensor unit 70 serves as detecting means that detects an input/output value Y of at least one of the first to fourth input/output ports 60a, 60c, 60b, 60d at predetermined detection period intervals and outputs a detection value Yd corresponding to the detected input/output value Y to the control unit 50. The detection value Yd may be a detected voltage obtained by detecting the input/output voltage, a detected current obtained by detecting the input/output current, or a detected power obtained by detecting the input/output power. The sensor unit 70 may be provided either inside or outside the power supply circuit 10.

The sensor unit 70 includes, for example, a voltage detection unit that detects the input/output voltage generated in at least one of the first to fourth input/output ports 60a, 60c, 60b, 60d. For example, the sensor unit 70 includes a primary side voltage detection unit that outputs at least one detected voltage from among an input/output voltage Va and an input/output voltage Vc as a primary side voltage detection value, and a secondary side voltage detection unit that outputs at least one detected voltage from among an input/output voltage Vb and an input/output voltage Vd as a secondary side voltage detection value.

The voltage detection unit of the sensor unit 70 includes, for example, a voltage sensor that monitors an input/output voltage value of at least one port, and a voltage detection circuit that outputs a detected voltage corresponding to the input/output voltage value monitored by the voltage sensor to the control unit 50.

The sensor unit 70 includes, for example, a current detection unit that detects the input/output current flowing through at least one of the first to fourth input/output ports 60a, 60c, 60b, 60d. For example, the sensor unit 70 includes a primary side current detection unit that outputs at least one detected current from among an input/output current Ia and an input/output current Ic as a primary side current detection value, and a secondary side current detection unit that outputs at least one detected current from among an input/output current Ib and an input/output current Id as a secondary side current detection value.

The current detection unit of the sensor unit 70 includes, for example, a current sensor that monitors an input/output current value of at least one port, and a current detection circuit that outputs a detected current corresponding to the input/output current value monitored by the current sensor to the control unit 50.

The power supply apparatus 101 includes the control unit 50. For example, the control unit 50 is an electronic circuit that includes a microcomputer having an inbuilt central processing unit (CPU). The control unit 50 may be provided either inside or outside the power supply circuit 10.

The control unit 50 feedback-controls a power conversion operation performed by the power supply circuit 10 such that the detected value Yd of the input/output value Y of at least one of the first to fourth input/output ports 60a, 60c, 60b, 60d converges on a target value Yo set in the port. For example, the target value Yo is a command value set by the control unit 50 or a predetermined apparatus other than the control unit 50 on the basis of driving conditions defined in relation to the respective loads (the primary side low voltage system load 61c and so on, for example) connected to the input/output ports. The target value Yo functions as an output target value when power is output from the port and an input target value when power is input into the port, and may be a target voltage value, a target current value, or a target power value.

Further, the control unit 50 feedback-controls the power conversion operation performed by the power supply circuit 10 such that a transmitted power P transmitted between the primary side conversion circuit 20 and the secondary side conversion circuit 30 via the transformer 400 converges on a set target transmitted power Po. The transmitted power will also be referred to as a power transmission amount. For example, the target transmitted power Po is a command value set by the control unit 50 or a predetermined apparatus other than the control unit 50 on the basis of a deviation between the detected value Yd and the target value Yo in one of the ports.

The control unit 50 feedback-controls the power conversion operation performed by the power supply circuit 10 by varying a value of a predetermined control parameter X, and is thus capable of adjusting the respective input/output values Y of the first to fourth input/output ports 60a, 60c, 60b, 60d of the power supply circuit 10. Two control variables, namely a phase difference φ and a duty ratio D (an ON time δ) are used as the main control parameters X.

The phase difference φ is a deviation (a time lag) between switching timings of identical-phase power conversion circuit units of the primary side full bridge circuit 200 and the secondary side full bridge circuit 300. The duty ratio D (the ON time δ) is a duty ratio (an ON time) between switching waveforms of the respective power conversion circuit units constituting the primary side full bridge circuit 200 and the secondary side full bridge circuit 300.

The two control parameters X can be controlled independently of each other. The control unit 50 varies the input/output values Y of the respective input/output ports of the power supply circuit 10 by performing duty ratio control and/or phase control on the primary side full bridge circuit 200 and the secondary side full bridge circuit 300 using the phase difference φ and the duty ratio D (the ON time δ).

Figure 2:
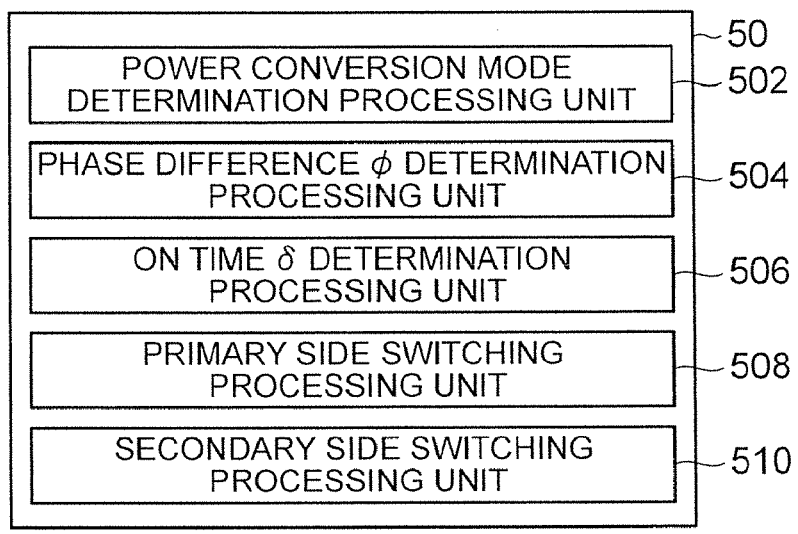
FIG. 2 is a block diagram showing an example of a configuration of a control unit according to this embodiment.

FIG. 2 is a block diagram of the control unit 50. The control unit 50 is a control unit having a function for performing switching control on the respective switching elements of the primary side conversion circuit 20, such as the primary side first upper arm U1, and the respective switching elements of the secondary side conversion circuit 30, such as the secondary side first upper arm U2. The control unit 50 is configured to include a power conversion mode determination processing unit 502, a phase difference φ determination processing unit 504, an ON time δ determination processing unit 506, a primary side switching processing unit 508, and a secondary side switching processing unit 510. For example, the control unit 50 is an electronic circuit that includes a microcomputer having an inbuilt CPU.

For example, the power conversion mode determination processing unit 502 selects and sets an operating mode from among power conversion modes A to L of the power supply circuit 10, to be described below, on the basis of a predetermined external signal (for example, a signal indicating the deviation between the detected value Yd and the target value Yo in one of the ports). As regards the power conversion modes, in mode A, power input from the first input/output port 60a is converted and output to the second input/output port 60c. In mode B, power input from the first input/output port 60a is converted and output to the third input/output port 60b. In mode C, power input from the first input/output port 60a is converted and output to the fourth input/output port 60d.

In mode D, power input from the second input/output port 60c is converted and output to the first input/output port 60a. In mode E, power input from the second input/output port 60e is converted and output to the third input/output port 60b. In mode F, power input from the second input/output port 60c is converted and output to the fourth input/output port 60d.

In mode G, power input from the third input/output port 60b is converted and output to the first input/output port 60a. In mode H, power input from the third input/output port 60b is converted and output to the second input/output port 60c. In mode I, power input from the third input/output port 60b is converted and output to the fourth input/output port 60d.

In mode J, power input from the fourth input/output port 60d is converted and output to the first input/output port 60a. In mode K, power input from the fourth input/output port 60d is converted and output to the second input/output port 60c. In mode L, power input from the fourth input/output port 60d is converted and output to the third input/output port 60b.

The phase difference φ determination processing unit 504 has a function for setting a phase difference φ between switching period motions of the switching elements between the primary side conversion circuit 20 and the secondary side conversion circuit 30 in order to cause the power supply circuit 10 to function as a (direct current-t (DC-DC) converter circuit.

The ON time δ determination processing unit 506 has a function for setting an ON time δ of the switching elements of the primary side conversion circuit 20 and the secondary side conversion circuit 30 in order to cause the primary side conversion circuit 20 and the secondary side conversion circuit 30 to function respectively as step-up/step-down circuits.

The primary side switching processing unit 508 has a function for performing switching control on the respective switching elements constituted by, the primary side first upper arm U1, the primary side first lower arm/U1, the primary side second upper arm V1, and the primary side second lower arm/V1, on the basis of outputs of the power conversion mode determination processing unit 502, the phase difference φ determination processing unit 504, and the ON time δ determination processing unit 506.

The secondary side switching processing unit 510 has a function for performing switching control on the respective switching elements constituted by the secondary side first upper arm U2, the secondary side first lower arm/U2, the secondary side second upper arm V2, and the secondary side second lower arm/V2, on the basis of the outputs of the power conversion mode determination processing unit 502, the phase difference φ determination processing unit 504, and the ON time δ determination processing unit 506.

An operation of the power supply apparatus 101 having the above configuration will now be described using FIGS. 1 and 2. When, for example, an external signal requesting an operation in which the power conversion mode of the power supply circuit 10 is set at mode F is input, the power conversion mode determination processing unit 502 of the control unit 50 sets the power conversion mode of the power supply circuit 10 to mode F. At this time, a voltage input into the second input/output port 60c is stepped up by a step-up function of the primary side conversion circuit 20, whereupon power having the stepped-up voltage is transmitted to the third input/output port 60b side by a DC-DC converter circuit function of the power supply circuit 10, stepped down by a step-down function of the secondary side conversion circuit 30, and then output from the fourth input/output port 60d.

Here, a step-up/step-down function of the primary side conversion circuit 20 will be described in detail. Focusing on the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Respective ends of the primary side first arm circuit 207 are connected to the first input/output port 60a, and as a result, a step-up/step-down circuit is attached between the terminal 616 of the second input/output port 60c and the first input/output port 60a.

The terminal 616 of the second input/output port 60c is also connected to the midpoint 211m of the primary side second arm circuit 211 via the primary side second winding 202b and the primary side second reactor 204b connected in series to the primary side second winding 202b. Respective ends of the primary side second arm circuit 211 are connected to the first input/output port 60a, and as a result, a step-up/step-down circuit is attached in parallel between the terminal 616 of the second input/output port 60c and the first input/output port 60a. Note that since the secondary side conversion circuit 30 is a circuit having a substantially identical configuration to the primary side conversion circuit 20, two step-up/step-down circuits are likewise connected in parallel between the terminal 622 of the fourth input/output port 60d and the third input/output port 60b. Hence, the secondary side conversion circuit 30 has an identical step-up/step-down function to the primary side conversion circuit 20.

Next, the function of the power supply circuit 10 as a DC-DC converter circuit will be described in detail. Focusing on the first input/output port 60a and the third input/output port 60b, the primary side full bridge circuit 200 is connected to the first input/output port 60a, and the secondary side full bridge circuit 300 is connected to the third input/output port 60b. When the primary side coil 202 provided in the bridge part of the primary side full bridge circuit 200 and the secondary side coil 302 provided in the bridge part of the secondary side full bridge circuit 300 are magnetically coupled by a coupling coefficient $k_T$, the transformer 400 functions as a center tapped transformer having a number of windings 1:N. Hence, by adjusting the phase difference $\phi$ between the switching period motions of the switching elements in the primary side full bridge circuit 200 and the secondary side full bridge circuit 300, power input into the first input/output port 60a can be converted and transmitted to the third input/output port 60b or power input into the third input/output port 60b can be converted and transmitted to the first input/output port 60a.

Figure 3:
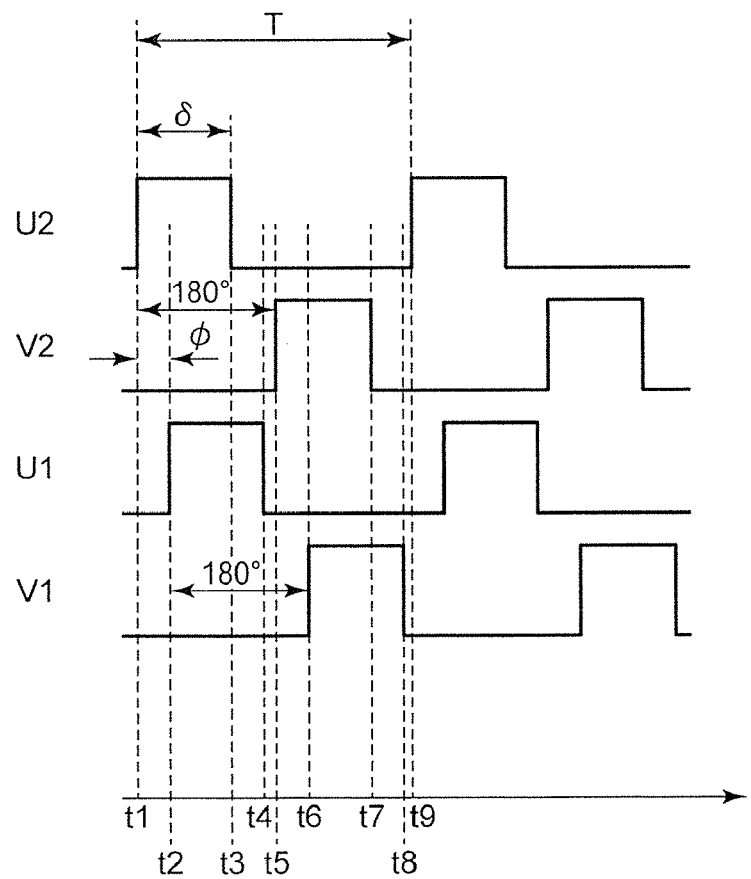
FIG. 3 is a timing chart showing an example of switching operations of a primary side circuit and a secondary side circuit according to this embodiment.

FIG. 3 is a view showing a timing chart of ON/OFF switching waveforms of the respective arms provided in the power supply circuit 10 resulting from control executed by the control unit 50. In FIG. 3, U1 is an ON/OFF waveform of the primary side first upper arm U1, V1 is an ON/OFF waveform of the primary side second upper arm V1, U2 is an ON/OFF waveform of the secondary side first upper aim U2, and V2 is an ON/OFF waveform of the secondary side second upper arm V2. ON/OFF waveforms of the primary side first lower arm/U1, the primary side second lower arm/V1, the secondary side first lower arm/U2, and the secondary side second lower arm/V2 are inverted waveforms (not shown) obtained by respectively inverting the ON/OFF waveforms of the primary side first upper arm U1, the primary side second upper arm V1, the secondary side first upper arm U2, and the secondary side second upper arm V2. Note that dead time is preferably provided between the respective ON/OFF waveforms of the upper and lower arms to prevent a through current from flowing when both the upper and lower arms are switched ON. Further, in FIG. 3, a high level indicates an ON condition and a low level indicates an OFF condition.

Here, by changing the respective ON times $\delta$ of U1, V1, U2, and V2, step-up/step-down ratios of the primary side conversion circuit 20 and the secondary side conversion circuit 30 can be modified. For example, by making the respective ON times $\delta$ of U1, V1, U2, and V2 equal to each other, the step-up/step-down ratio of the primary side conversion circuit 20 can be made equal to the step-up/step-down ratio of the secondary side conversion circuit 30.

The ON time $\delta$ determination processing unit 506 make the respective ON times $\delta$ of U1, V1, U2, and V2 equal to each other (respective ON times $\delta$=primary side ON time $\delta 11$=secondary side ON time $\delta 12$=time value $\alpha$) so that the respective step-up/step-down ratios of the primary side conversion circuit 20 and the secondary side conversion circuit 30 are equal to each other.

The step-up/step-down ratio of the primary side conversion circuit 20 is determined by the duty ratio D, which is a proportion of a switching period T of the switching elements (arms) constituting the primary side full bridge circuit 200 occupied by the ON time $\delta$. Similarly, the step-up/step-down ratio of the secondary side conversion circuit 30 is determined by the duty ratio D, which is a proportion of the switching period T of the switching elements (arms) constituting the secondary side full bridge circuit 300 occupied by the ON time $\delta$. The step-up/step-down ratio of the primary side conversion circuit 20 is a transformation ratio between the first input/output port 60a and the second input/output port 60c, while the step-up/step-down ratio of the secondary side conversion circuit 30 is a transformation ratio between the third input/output port 60b and the fourth input/output port 60d.

Therefore, for example,
the step-up/step-down ratio of the primary side conversion circuit 20=the voltage of the second input/output port 60c/the voltage of the first input/output port 60a=$\delta 11/T=\alpha/T$, and the step-up/step-down ratio of the secondary side conversion circuit 30=the voltage of the fourth input/output port 60d/the voltage of the third input/output port 60b=$\delta 12/T=\alpha/T$.

In other words, the respective step-up/step-down ratios of the primary side conversion circuit 20 and the secondary side conversion circuit 30 take identical values (=$\alpha/T$).

Note that the ON time $\delta$ in FIG. 3 represents both the ON time $\delta 11$ of the primary side first upper arm U11 and the primary side second upper arm V1 and the ON time $\delta 12$ of the secondary side first upper arm U2 and the secondary side second upper arm V2. Further, the switching period T of the arms constituting the primary side full bridge circuit 200 and the switching period T of the arms constituting the secondary side full bridge circuit 300 are equal times.

Furthermore, a phase difference between U1 and V1 is activated at 180 degrees ($\pi$), and a phase difference between U2 and V2 is likewise activated at 180 degrees ($\pi$). Moreover, by changing the phase difference $\phi$ between U1 and U2, the power transmission amount P between the primary side conversion circuit 20 and the secondary side conversion circuit 30 can be adjusted such that when the phase difference $\phi$>0, power can be transmitted from the primary side conversion circuit 20 to the secondary side conversion circuit 30, and when the phase difference φ<0, power can be transmitted from the secondary side conversion circuit 30 to the primary side conversion circuit 20.

The phase difference φ is a deviation (a time lag) between the switching timings of identical-phase power conversion circuit units of the primary side full bridge circuit 200 and the secondary side full bridge circuit 300. For example, the phase difference φ is a deviation between the switching timings of the primary side first arm circuit 207 and the secondary side first arm circuit 307, and a deviation between the switching timings of the primary side second arm circuit 211 and the secondary side second arm circuit 311. These deviations are controlled to be equal to each other. In other words, the phase difference φ between U1 and U2 and the phase difference φ between V1 and V2 are controlled to identical values.

Hence, when, for example, an external signal requesting an operation in which the power conversion mode of the power supply circuit 10 is set at mode F is input, the power conversion mode determination processing unit 502 selects and sets mode F. The ON time δ determination processing unit 506 then sets the ON time δ to define a step-up ratio required when the primary side conversion circuit 20 is caused to function as a step-up circuit that steps up the voltage input into the second input/output port 60c and outputs the stepped-up voltage to the first input/output port 60a. Note that the secondary side conversion circuit 30 functions as a step-down circuit that steps down the voltage input into the third input/output port 60b at a step-down ratio defined in accordance with the ON time δ set by the ON time δ determination processing unit 506, and outputs the stepped-down voltage to the fourth input/output port 60d. Further, the phase difference φ determination processing unit 504 sets the phase difference φ such that the power input into the first input/output port 60a is transmitted to the third input/output port 60b in the desired power transmission amount P.

The primary side switching processing unit 508 performs switching control on the respective switching elements constituted by the primary side first upper arm U1, the primary side first lower arm/U1, the primary side second upper arm V1, and the primary side second lower arm/V1 to cause the primary side conversion circuit 20 to function as a step-up circuit and to cause the primary side conversion circuit 20 to function as a part of a DC-DC converter circuit.

The secondary side switching processing unit 510 performs switching control on the respective switching elements constituted by the secondary side first upper arm U2, the secondary side first lower arm/U2, the secondary side second upper arm V2, and the secondary side second lower arm/V2 to cause the secondary side conversion circuit 30 to function as a step-down circuit and to cause the secondary side conversion circuit 30 to function as a part of a DC-DC converter circuit.

As described above, the primary side conversion circuit 20 and the secondary side conversion circuit 30 can be caused to function as a step-up circuit or a step-down circuit, and the power supply circuit 10 can be caused to function as a bidirectional DC-DC converter circuit. Therefore, power conversion can be performed in all of the power conversion modes A to L, or in other words, power conversion can be performed between two input/output ports selected from the four input/output ports.

The transmitted power P (also referred to as the power transmission amount P) adjusted by the control unit 50 in accordance with the phase difference φ is power transmitted from one of the primary side conversion circuit 20 and the secondary side conversion circuit 30 to the other via the transformer 400, and is expressed as $$P=(N\times Va\times Vb)/(\pi\times\omega\times L)\times F(D,\phi) \qquad \text{Equation 1}$$

Note that N is a winding ratio of the transformer 400, Va is the input/output voltage of the first input/output port 60a, Vb is the input/output voltage of the third input/output port 60b, π is pi, ω (=2π×f=2π/T) is an angular frequency of the switching operations of the primary side conversion circuit 20 and the secondary side conversion circuit 30, f is a switching frequency of the primary side conversion circuit 20 and the secondary side conversion circuit 30, T is the switching period of the primary side conversion circuit 20 and the secondary side conversion circuit 30, L is an equivalent inductance of the magnetic coupling reactors 204, 304 and the transformer 400 relating to power transmission, and F (D, φ) is a function having the duty ratio D and the phase difference φ as variables and a variable that increases monotonically as the phase difference φ increases, independently of the duty ratio D. The duty ratio D and the phase difference φ are control parameters designed to vary within a range sandwiched between predetermined upper and lower limit values.

The control unit 50 adjusts the transmitted power P by changing the phase difference φ such that a port voltage Vp of at least one predetermined port from among the primary side ports and the secondary side ports converges on the target voltage Vo. Therefore, even when a current consumption of the load connected to the predetermined port increases, the control unit 50 can prevent the port voltage Vp from dropping relative to the target voltage Vo by varying the phase difference φ in order to adjust the transmitted power P.

For example, the control unit 50 adjusts the transmitted power P by changing the phase difference φ such that the port voltage Vp in one port serving as a transmission destination of the transmitted power P, from among the primary side ports and the secondary side ports, converges on the target voltage Vo. Therefore, even when the current consumption of the load connected to the port serving as the transmission destination of the transmitted power P increases, the control unit 50 can prevent the port voltage Vp from dropping relative to the target voltage Vo by increasing the phase difference φ in order to adjust the transmitted power P in an increasing direction.

Incidentally, when a current flowing through the port serving as the transmission destination of the transmitted power P exceeds a designed envisaged value (when an additional load is appended to the port or the like, for example), the control unit 50 increases the phase difference φ so that the transmitted power P increases, and as a result, the phase difference φ may reach an upper limit value φmax. However, the control unit 50 cannot increase the phase difference φ beyond the upper limit value φmax, and therefore, if the transmitted power P generated when the phase difference φ is equal to the upper limit value φmax is smaller than an amount of power required by the port, the port voltage Vp decreases relative to the target voltage Vo.

Hence, the control unit 50 includes reducing means that reduces the target voltage Vo when a condition in which the phase difference φ is equal to the upper limit value φmax and the port voltage Vp of the transmission destination port is lower than a set threshold Vth is detected.

When the target voltage Vo serving as a target value of the port voltage Vp decreases, the actual port voltage Vp is also reduced by the control unit 50 in alignment with the reduction in the target voltage Vo. When, for example, a power supply such as a battery is connected to the transmission destination port and the port voltage Vp of the transmission destination port decreases, a port current Ip output from the transmission destination port decreases in accordance with a balance between a power supply voltage and an inductance of the power supply and the port voltage Vp and inductance of the transmission destination port. When the port current Ip decreases, a power supply current Is output from the power supply connected to the transmission destination port increases. and therefore a drop in the port voltage Vp of the transmission destination port can be prevented even if the current consumption of the load connected to the transmission destination port increases.

When, for example, the phase difference $\phi$ is equal to the upper limit value $\phi$max and the port voltage of one of two ports serving as transmission destinations of the transmitted power P is lower than the set threshold Vth, the control unit 50 reduces the target voltage of the other port.

For example, when the phase difference $\phi$ is equal to the upper limit value $\phi$max and the port voltage Va of the first input/output port 60a is lower than the set threshold Vth, the control unit 50 reduces a target voltage Vco of the port voltage Vc of the second input/output port 60c. When the target voltage Vco decreases, the actual port voltage Vc also decreases, leading to a reduction in an amount of power output to the primary side low voltage system load 61c from the second input/output port 60c. Hence, even when the current consumption of the primary side high voltage system load 61a connected to the first input/output port 60a increases excessively, the reduction in the amount of power output to the primary side low voltage system load 61c from the second input/output port 60c can be shifted to the first input/output port 60a, and therefore a drop in the port voltage Va can be suppressed.

Further, for example, when the phase difference $\phi$ is equal to the upper limit value $\phi$max and the port voltage Vc of the second input/output port 60c is lower than the set threshold Vth, the control unit 50 may reduce a target voltage Vao of the port voltage Va of the first input/output port 60a. When the target voltage Vao decreases, the actual port voltage Va also decreases, leading to a reduction in an amount of power output to the primary side high voltage system load 61a from the first input/output port 60a. Hence, even when the current consumption of the primary side low voltage system load 61c connected to the second input/output port 60c increases excessively, the reduction in the amount of power output to the primary side high voltage system load 61a from the first input/output port 60a can be shifted to the second input/output port 60c, and therefore a drop in the port voltage Vc can be suppressed.

Figure 4:
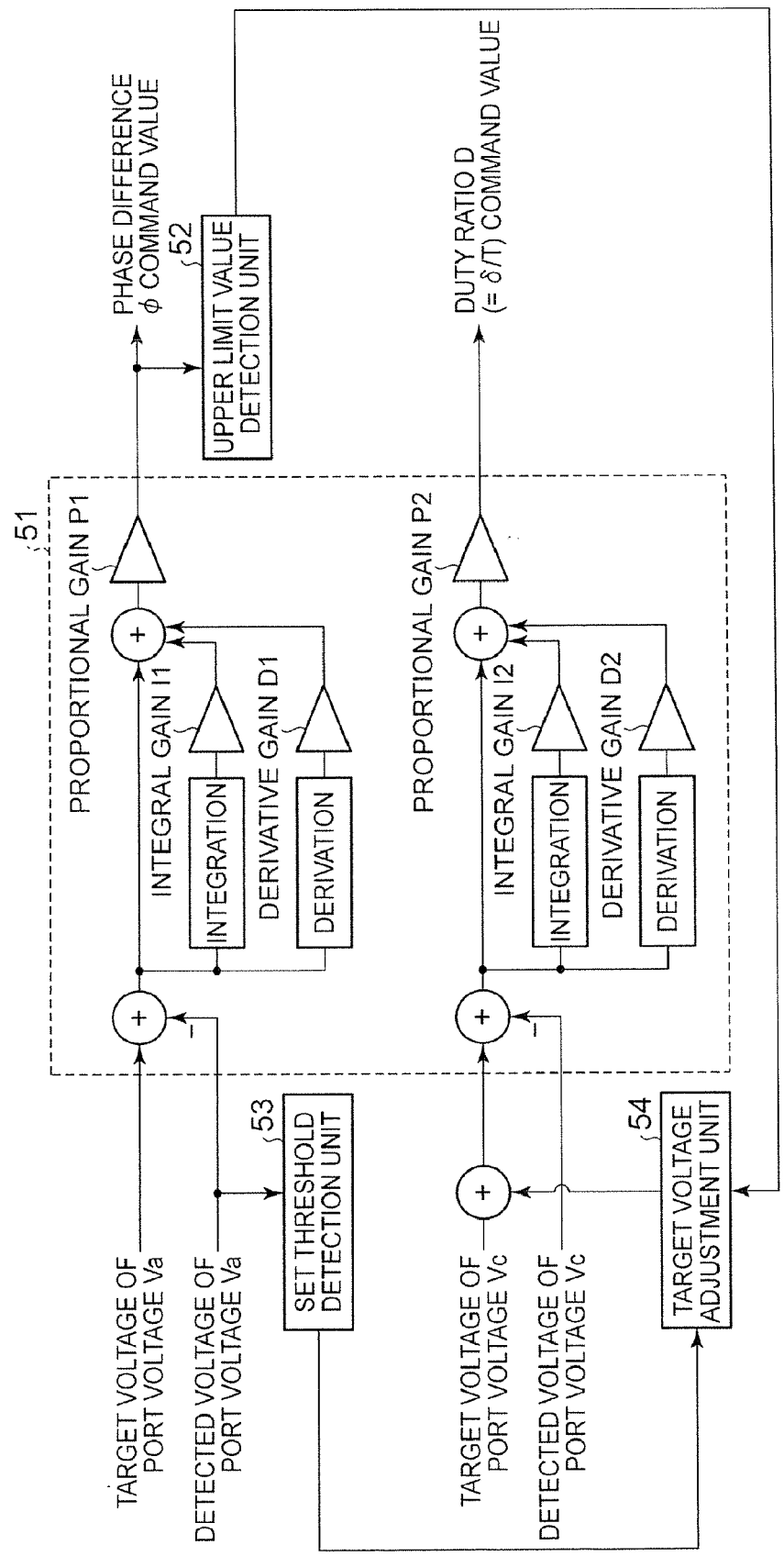
FIG. 4 is a block diagram showing an example of a configuration of the control unit according to this embodiment.

FIG. 4 is a block diagram showing an example of a configuration of the control unit 50. The control unit 50 includes a proportion integral derivative (PID) control unit 51, an upper limit value detection unit 52, a set threshold detection unit 53, and a target voltage adjustment unit 54.

The PID control unit 51 includes a phase difference command value generation unit that generates, through PID control performed at intervals of the switching period T, a command value $\phi$o of the phase difference $\phi$ for causing a port voltage Vp1 of a first port, from among the ports serving as the transmission destinations of the transmitted power P, to converge on a first target voltage Vo1.

For example, the phase difference command value generation unit of the PID control unit 51 generates the command value $\phi$o of the phase difference $\phi$ to cause the port voltage Va of the first input/output port 60a, which constitutes a high potential side port of the ports serving as the transmission destinations of the transmitted power P, to converge on the target voltage Vao. The phase difference command value generation unit performs PID control on the basis of a deviation between the target voltage Vao of the port voltage Va and a detected voltage Vad of the port voltage Va, which is obtained by the sensor unit 70, in order to generate a command value $\phi$o for causing this deviation to converge on zero at intervals of the switching period T.

The control unit 50 adjusts the transmitted power P such that the port voltage Vp1 converges on the first target voltage Vo1 by performing switching control on the primary side conversion circuit 20 and the secondary side conversion circuit 30 in accordance with the command value $\phi$o generated by the PID control unit 51. For example, the control unit 50 adjusts the transmitted power P determined in accordance with Equation 1 by changing the command value $\phi$o of the phase difference $\phi$ such that the detected voltage Vad of the port voltage Va converges on the target voltage Vao of the port voltage Va.

The PID control unit 51 also includes a duty ratio command value generation unit that generates, through PID control performed at intervals of the switching period T, a command value Do of the duty ratio D for causing a port voltage Vp2 of a second port, from among the ports serving as the transmission destinations of the transmitted power P, to converge on a second target voltage Vo2.

For example, the duty ratio command value generation unit of the PID control unit 51 generates the command value Do of the duty ratio D to cause the port voltage Vc of the second input/output port 60c, which constitutes a low potential side port of the ports serving as the transmission destinations of the transmitted power P, to converge on the target voltage Vco. The duty ratio command value generation unit performs PID control on the basis of a deviation between the target voltage Vco of the port voltage Vc and a detected voltage Vcd of the port voltage Vc, which is obtained by the sensor unit 70, in order to generate a command value Do for causing this deviation to converge on zero at intervals of the switching period T.

The control unit 50 adjusts a step-up/step-down ratio such that the port voltage Vp2 converges on the second target voltage Vo2 by performing switching control on the primary side conversion circuit 20 and the secondary side conversion circuit 30 in accordance with the command value Do generated by the PID control unit 51. This step-up/step-down ratio is a transformation ratio between the first port and the second port of the ports serving as the transmission destinations of the transmitted power P. For example, the control unit 50 adjusts the step-up/step-down ratio between the first input/output port 60a and the second input/output port 60c by changing the command value Do of the duty ratio D such that the detected voltage Vcd of the port voltage Vc converges on the target voltage Vco of the port voltage Vc.

Note that the PID control unit 51 may include an ON time command value generation unit that generates a command value $\delta$o of the ON time $\delta$ instead of the command value Do of the duty ratio D.

The upper limit value detection unit 52 is means for detecting whether or not the command value $\phi$o of the phase difference $\phi$ is equal to the upper limit value $\phi$max.

The set threshold detection unit 53 is means for detecting whether or not the detected value of the port voltage Vp1 of the first port, from among the ports serving as the transmission destinations of the transmitted power P, is lower than the set threshold Vth. For example, the set threshold detection unit 53 detects whether or not the detected voltage Vad of the port voltage Va is lower than the set threshold Vth.

The target voltage adjustment unit 54 is means for adjusting the second target voltage Vo2 of the port voltage Vp2 of the second port, from among the ports serving as the transmission destinations of the transmitted power P, on the basis of detection results from the upper limit value detection unit 52 and the set threshold detection unit 53. For example, the target voltage adjustment unit 54 is means for adjusting the target voltage Vco of the port voltage Vc that is compared with the detected voltage Vcd of the port voltage Vc.

Figure 5:
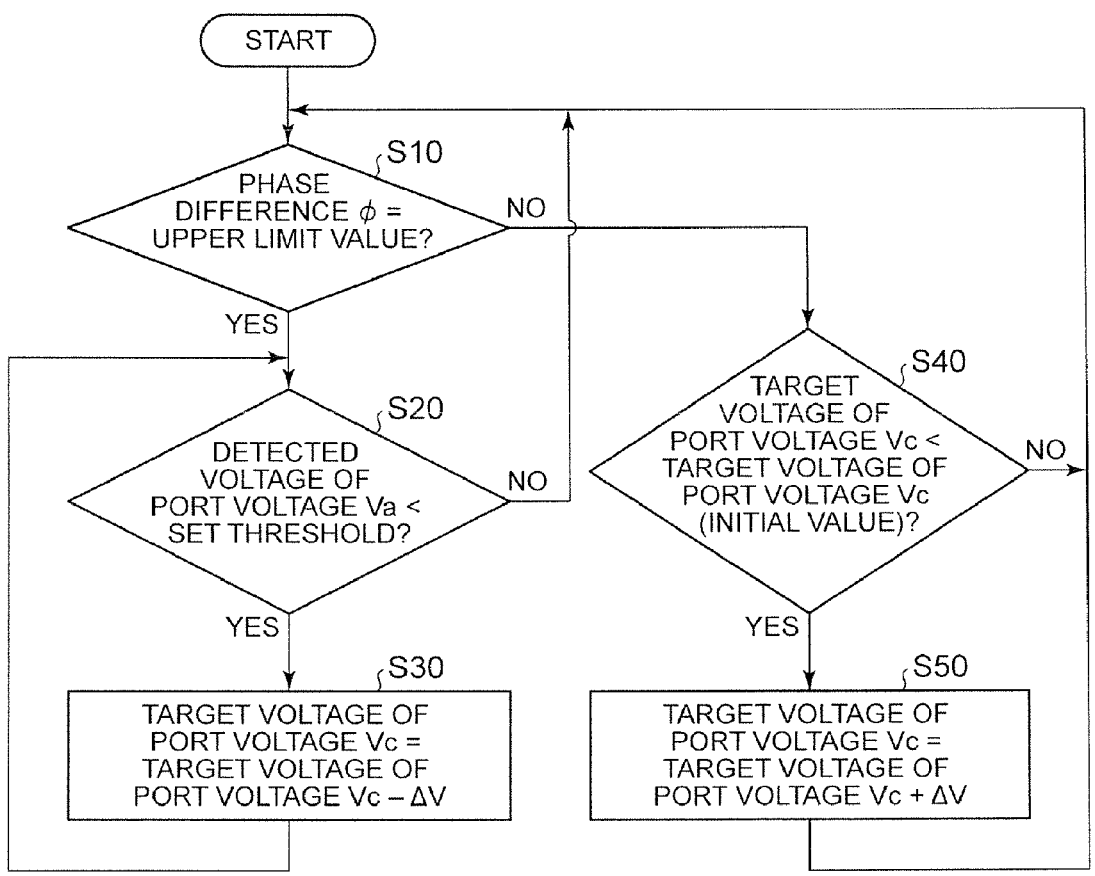
FIG. 5 is a flowchart showing an example of a power conversion method according to the invention.

FIG. 5 is a flowchart showing an example of a power conversion method. The power conversion method shown in FIG. 5 is executed by the control unit 50.

In step S10, the target voltage adjustment unit 54 determines whether or not the command value φo of the phase difference φ is equal to the upper limit value φmax. By determining whether or not the command value φo of the phase difference φ is equal to the upper limit value φmax, it is possible to determine whether or not the command value φo is stuck to the upper limit value φmax as a result of the control.

When the upper limit value detection unit 52 detects that the command value φo of the phase difference φ is equal to the upper limit value φmax, this means that the command value φo is fixed at the upper limit value φmax, and therefore the target voltage adjustment unit 54 executes processing of step S20. When, on the other hand, the upper limit value detection unit 52 detects that the command value φo of the phase difference φ is not equal to the upper limit value φmax (in other words, that the command value φo is smaller than the upper limit value φmax), this means that the command value φo is smaller than the upper limit value φmax, and therefore the target voltage adjustment unit 54 executes processing of step S40.

In step S20, the target voltage adjustment unit 54 determines whether or not the detected voltage Vad of the port voltage Va is lower than the set threshold Vth. When the set threshold detection unit 53 detects that the detected voltage Vad of the port voltage Va is lower than the set threshold Vth, the target voltage adjustment unit 54 executes processing of step S30. When the command value φo matches the upper limit value φmax, a condition in which the detected voltage Vad of the port voltage Va is lower than the set threshold Vth indicates that the port voltage Va has dropped due to a power deficiency in the first input/output port 60a even though output of the transmitted power P is at a maximum.

In step S30, therefore, the target voltage adjustment unit 54 reduces the target voltage Vco of the port voltage Vc in order to suppress the drop in the port voltage Va.

The target voltage Vco is normally set at a considerably higher value than a power supply voltage of the primary side low voltage system power supply 62c, and therefore a current flowing through the primary side low voltage system load 61c is supplied from the second input/output port 60c but substantially not supplied from the primary side low voltage system power supply 62c (see FIG. 1). In other words, the primary side low voltage system power supply 62c is normally charged by the port voltage Vc of the second input/output port 60c.

When the target voltage Vco serving as the target value of the port voltage Vc decreases from its normal value, the actual port voltage Vc is reduced in alignment with the reduction in the target voltage Vco by the duty ratio command value generation unit of the PID control unit 51 shown in FIG. 4. When the port voltage Vc decreases, the port current Ic output from the second input/output port 60c decreases in accordance with the balance between the power supply voltage and inductance of the primary side low voltage system power supply 62c and the port voltage Vc and inductance of the second input/output port 60c. When the port current Ip starts to decrease, a power supply current Ics output from the primary side low voltage system power supply 62c connected to the second input/output port 60c starts to increase.

In particular, when the target voltage adjustment unit 54 reduces the target voltage Vco below the power supply voltage of the primary side low voltage system power supply 62c, the current flowing through the primary side low voltage system load 61c is supplied from the primary side low voltage system power supply 62c and substantially not supplied from the second input/output port 60c. In other words, when the target voltage Vco is lower than the power supply voltage of the primary side low voltage system power supply 62c, the primary side low voltage system power supply 62c is discharged.

Hence, by reducing the target voltage Vco, an overall power consumption (current consumption) of the power supply circuit 10 can be reduced, and as a result, a condition in which the phase difference φ remains fixed at the upper limit value φmax can be avoided. Further, the power supply current Ics output from the primary side low voltage system power supply 62c increases, and therefore, even when the current consumption of the primary side low voltage system load 61c increases and the port current Ic output from the second input/output port 60c decreases, a drop in the port voltage Vc can be suppressed. Moreover, the primary side low voltage system power supply 62c is connected to the second input/output port 60c, and therefore the port voltage Vc is unlikely to drop below the power supply voltage of the primary side low voltage system power supply 62c.

On the other hand, only the primary side high voltage system load 61a, and no power supply, is connected to the first input/output port 60a. However, the amount of power output from the second input/output port 60c decreases, and therefore a drop in the port voltage Va can be suppressed by the transmitted power P supplied from the first input/output port 60a via the transformer 400 even when the current consumption of the primary side high voltage system load 61a increases. In other words, the reduction in the amount of power output from the second input/output port 60c can be shifted to the power output from the first input/output port 60a.

In steps S20 and S30 of FIG. 5, the target voltage adjustment unit 54 reduces the target voltage Vco of the port voltage Vc until the detected voltage Vad of the port voltage Va increases at least to or above the set threshold Vth. As a result of the reduction in the target power Vc, the amount of power output from the second input/output port 60c decreases, leading to an increase in the amount of power output from the first input/output port 60a. Accordingly, the dropped port voltage Va rises.

Further, in step S30, the target voltage adjustment unit 54 reduces the target voltage Vco gradually at intervals of a predetermined voltage reduction width ΔV. By reducing the target voltage gradually, rapid variation in the port voltage that is compared with the target voltage can be prevented. The target voltage adjustment unit 54 executes the processing of step S20 every time the target voltage Vco is reduced by the voltage reduction width ΔV.

When the set threshold detection unit 53 detects in step S20 that the detected voltage Vad of the port voltage Va equals or exceeds the set threshold Vth, this indicates a reduction in the amount by which the port voltage Va has dropped, and therefore the target voltage adjustment unit 54 executes the processing of step S10.

In step S40, meanwhile, the target voltage adjustment unit 54 determines whether or not the target voltage Vco of the port voltage Vc is lower than an initial value of the target voltage Vco. The initial value of the target voltage Vco is a reference value set under normal conditions as a normal value, for example, and corresponds to a higher voltage than the normal power supply voltage of the primary side low voltage system power supply 62c. After detecting that the target voltage Vco is lower than the initial value, the target voltage adjustment unit 54 increases the target voltage Vco until the target voltage Vco reaches or exceeds the initial value (steps S40 and S50). As a result, the target voltage Vco reduced in step S30 can be returned to its original value.

Further, in step S50, the target voltage adjustment unit 54 increases the target voltage Vco gradually at intervals of a predetermined voltage increase width ΔV. By increasing the target voltage gradually, rapid variation in the port voltage that is compared with the target voltage can be prevented.

When the target voltage Vco has been increased by the voltage reduction width ΔV, the target voltage adjustment unit 54 executes the processing of step S10.

An embodiment of the power conversion apparatus and power conversion method was described above, but the invention is not limited to the above embodiment, and various amendments and improvements, such as combining or replacing the above embodiment either partially or wholly with another embodiment, may be implemented within the scope of the invention.

For example, in the above embodiment, a MOSFET, which is a semiconductor element subjected to an ON/OFF operation, was cited as an example of the switching element. However, the switching element may be a voltage control type power element using an insulating gate such as an insulated gate bipolar transistor (IGBT) or a MOSFET, or a bipolar transistor, for example.

Further, a power supply may be connected to the first input/output port 60a, and a power supply may be connected to the fourth input/output port 60d. Furthermore, a power supply need not be connected to the second input/output port 60c, and a power supply need not be connected to the third input/output port 60b.

Moreover, in FIG. 1, the primary side low voltage system power supply 62c is connected to the second input/output port 60c, but a power supply need not be connected to either the first input/output port 60a or the second input/output port 60c.

Furthermore, the invention is not limited to a case in which power is transmitted from a secondary side port to a primary side port, and may also be applied to a case in which power is transmitted from a primary side port to a secondary side port.

What is claimed is:

1. A power conversion apparatus comprising:
a primary side circuit;
a secondary side circuit configured to be magnetically coupled to the primary side circuit by a transformer; and
a control unit configured to adjust a transmitted power transmitted between the primary side circuit and the secondary side circuit by changing a phase difference between a switching operation of the primary side circuit and a switching operation of the secondary side circuit such that a port voltage of one port from among a primary side port provided in the primary side circuit and a secondary side port provided in the secondary side circuit converges on a target voltage,
wherein the control unit reduces the target voltage when the phase difference is equal to an upper limit value and the port voltage is smaller than a set threshold.

2. The power conversion apparatus according to claim 1, wherein the control unit reduces the target voltage until the port voltage reaches or exceeds the set threshold.

3. The power conversion apparatus according to claim 1, wherein the control unit reduces the target voltage gradually.

4. The power conversion apparatus according to claim 1, wherein the control unit increases the target voltage when the phase difference is smaller than the upper limit value and the target voltage is lower than a reference value.

5. The power conversion apparatus according to claim 4, wherein the control unit increases the target voltage until the target voltage reaches or exceeds the reference value.

6. The power conversion apparatus according to claim 4, wherein the control unit increases the target voltage gradually.

7. The power conversion apparatus according to claim 1, wherein the one port includes a first port and a second port,
the control unit adjusts the transmitted power such that a port voltage of the first port converges on a first target voltage, and adjusts a transformation ratio between the first port and the second port such that a port voltage of the second port converges on a second target voltage, and
when the phase difference is equal to the upper limit value and the port voltage of one port from among the first port and the second port is lower than the set threshold, the control unit reduces the target voltage of the other port.

8. A power conversion method for adjusting a transmitted power transmitted between a primary side circuit and a secondary side circuit, which is magnetically coupled to the primary side circuit by a transformer, by changing a phase difference between a switching operation of the primary side circuit and a switching operation of the secondary side circuit such that a port voltage of one port from among a primary side port provided in the primary side circuit and a secondary side port provided in the secondary side circuit converges on a target voltage, the method comprising:
reducing the target voltage when the phase difference is equal to an upper limit value and the port voltage is smaller than a set threshold.

* * * * *